US012636945B1

(12) United States Patent　　　　(10) Patent No.:　US 12,636,945 B1

Engerman et al.　　　　　　　　　(45) Date of Patent:　　May 26, 2026

(54) HYBRID ELECTRIC AXLE AND OPERATING METHOD

(71) Applicant: Dana Automotive Systems Group, LLC, Maumee, OH (US)

(72) Inventors: Eric M. Engerman, Plymouth, MI (US); Trent Windom, Waterville, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 19/038,408

(22) Filed: Jan. 27, 2025

(51) Int. Cl.
　　B60K 6/365　　　(2007.10)
　　B60K 6/383　　　(2007.10)
　　B60K 6/387　　　(2007.10)
　　B60K 6/405　　　(2007.10)

(52) U.S. Cl.
　　CPC .............. B60K 6/365 (2013.01); B60K 6/383 (2013.01); B60K 6/387 (2013.01); B60K 6/405 (2013.01)

(58) Field of Classification Search
　　CPC .... B60K 17/02; B60K 17/043; B60K 17/046; B60K 17/12; B60K 17/16; B60K 17/165; B60K 6/20–6/547; F16H 2200/2097; F16H 2200/2007; F16D 23/00–148
　　See application file for complete search history.

(56) References Cited

U.S. PATENT DOCUMENTS

| | | | |
|---|---|---|---|
| 11,480,222 B2 | 10/2022 | Engerman | |
| 12,173,756 B1 * | 12/2024 | Colombo | ................ F16D 23/14 |
| 2007/0289834 A1 * | 12/2007 | Razzacki | ................ F16D 23/06 |
| | | | 192/53.3 |
| 2018/0134278 A1 * | 5/2018 | Gotoda | ................. B60W 20/15 |
| 2020/0096084 A1 * | 3/2020 | Engerman | ............... F16H 3/006 |
| 2021/0260985 A1 * | 8/2021 | Park | ........................ B60K 17/16 |
| 2022/0128124 A1 * | 4/2022 | Engerman | ........... F16H 57/0435 |

FOREIGN PATENT DOCUMENTS

| | | | | |
|---|---|---|---|---|
| DE | 102010031746 A1 * | 1/2012 | ............... F16H 3/54 |
| DE | 102017007088 A1 * | 1/2019 | ............... F16H 3/66 |
| DE | 102018008886 A1 * | 5/2019 | ............ B60K 6/365 |
| JP | 2017193320 A * | 10/2017 | |
| KR | 20150125089 A * | 11/2015 | ............ B60K 17/06 |

* cited by examiner

*Primary Examiner* — Ernesto A Suarez
*Assistant Examiner* — Lillian T Nguyen
(74) *Attorney, Agent, or Firm* — McCoy Russell LLP

(57)　　　　　ABSTRACT

A system and method for a hybrid electric axle. The hybrid electric axle system, in one example, includes an engine interface assembly with a one-way clutch that is rotationally coupled to an input shaft and a gear shaft in a gear set that is rotationally coupled to a differential and a dog clutch configured to selectively rotationally couple the input shaft and the gear shaft in the gear set. The hybrid electric axle system further includes an electric drive assembly including a traction motor that is rotationally coupled to a gear train. In the electric axle system, the gear train is rotationally coupled to the differential and the engine interface assembly and the electric drive assembly are packaged in an axle housing.

18 Claims, 10 Drawing Sheets

HYBRID ELECTRIC AXLE AND OPERATING METHOD

TECHNICAL FIELD

The present disclosure relates to a hybrid electric axle with an engine interface assembly.

BACKGROUND AND SUMMARY

Segments of the vehicle market are moving towards electrification. The inventors have recognized a need to further increase electric powertrain efficiency in a cost effective and space efficient package. In some hybrid vehicles synchronizing engine speed is challenging and in existing disconnect drive systems, a wet friction clutch is used in the rear drive unit or transfer case to synchronize the system. The inventors have recognized that in hybrid electric axles, the size of the clutch that would be demanded would be problematic for packaging and pinion nose vibration due to the companion flange being far away from the wheel axis of the axle. This is also a problem for drive shaft articulation angles as it greatly reduces the length of the drive shaft. The use of a dog clutch may resolve some the aforementioned issues but would be unable to synchronize engagement of the dog clutch. Further, engine speed control would generally not be accurate enough to achieve desired synchronization functionality.

The inventors have recognized the abovementioned challenges and developed a hybrid electric axle system to at least partially overcome the challenges. The hybrid electric axle system includes, in one example, an engine interface assembly that includes a one-way clutch rotationally coupled to an input shaft and a gear shaft in a gear set that is rotationally coupled to a differential and a dog clutch configured to selectively rotationally couple the input shaft and the gear shaft in the gear set. In the hybrid electric axle system, the input shaft includes a mechanical interface that is configured to receive mechanical power from an internal combustion engine. The hybrid electric axle system further includes an electric drive assembly including a traction motor that is rotationally coupled to a gear train. Further, in the hybrid electric axle system the gear train is rotationally coupled to the differential and the engine interface assembly and the electric drive assembly are packaged in an axle housing. In this way, the electric axle achieves increased space efficiency and decreases in mass, complexity, and noise, vibration, and harshness (NVH) in comparison to systems that use wet clutches to synchronize the engine speed to the axle speeds.

In one example, the dog clutch may include a lock ring with teeth that mate with teeth in the gear and the teeth in the lock ring may include leading faces that are chamfered. Further, in such an example, the dog clutch includes an indexing ball and spring that are arranged in a recess in the input shaft. In this way, dog clutch engagement/disengagement unfolds more smoothly, further decreasing NVH during clutch operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A hybrid electric axle is described herein that includes an engine interface assembly that includes a one-way clutch that works in conjunction with a dog clutch to allow power transfer to the axle to be selectively permitted without demanding synchronization of the engine. To elaborate, due to the one-way clutch, as soon as the engine speed is matched with the wheel speed, the hybrid electric axle has drive. However, the one-way clutch may not be able to perform coast function and will have unstable loading as the speeds of the wheel and engine or torque flow changes. Therefore, after the one-way clutch connects the to the input shaft, the dog clutch is engaged to mitigate or altogether avoid the aforementioned issues. However, there is no delta rotation between the shafts and so the dog clutch may be designed to index itself by a single tooth, in one example. Further, a ball detent and multiple ramps may be cut into the engagement spline of the dog clutch and the backlash in the shaft spline may be tuned to accommodate this indexing. Consequently, packaging, monetary, mass, and noise, vibration, and harshness (NVH) gains can be achieved, in comparison to systems that use wet clutches for synchronization.

Figure 1:
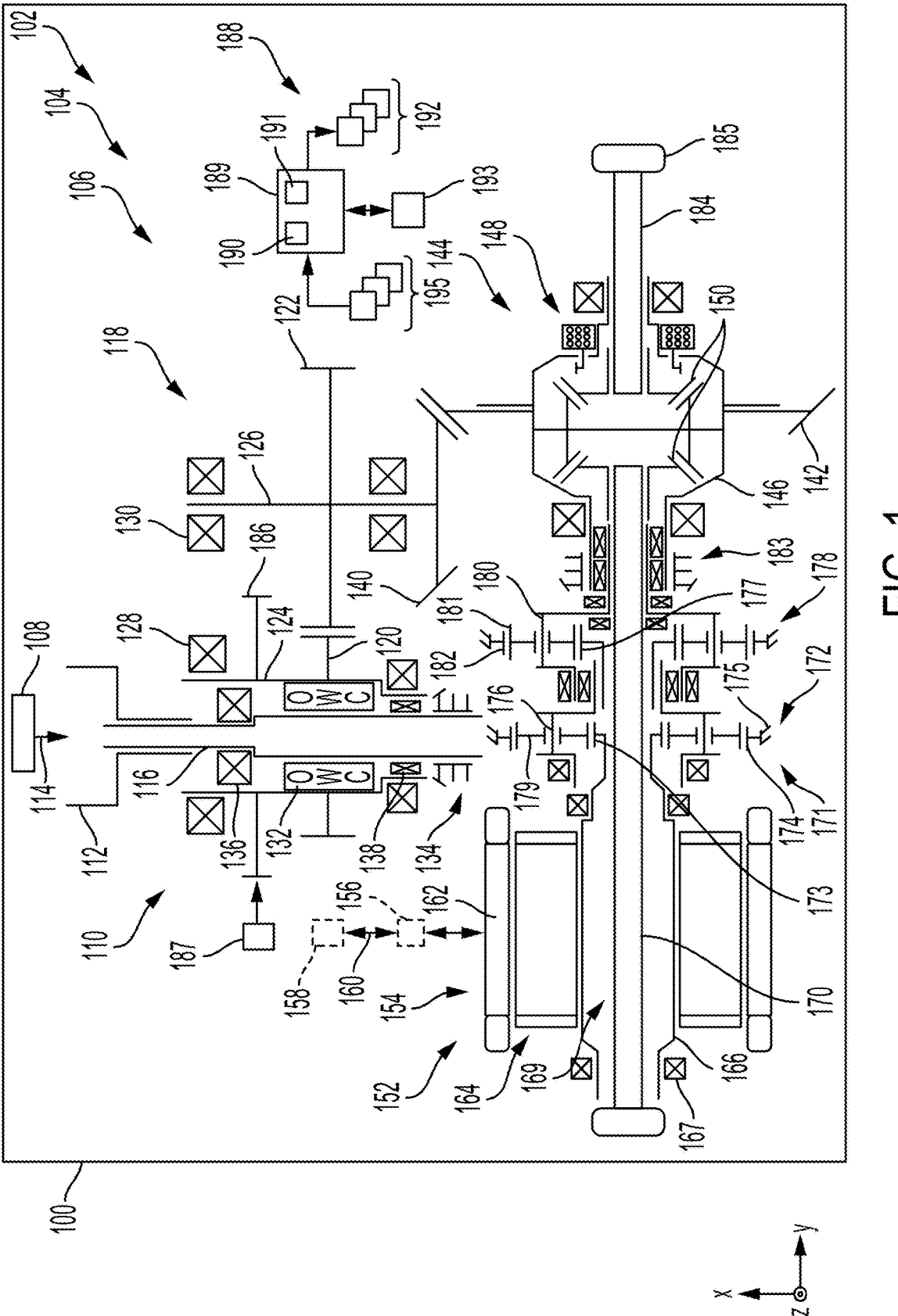
FIG. 1 shows a stick diagram of an example of a hybrid electric vehicle (HEV) with a hybrid electric axle.

FIG. 1 shows a hybrid electric vehicle (HEV) 100 that includes a hybrid electric powertrain 102 with a hybrid electric axle 104 that includes a hybrid electric axle system 106. The hybrid electric powertrain 102 include an internal combustion engine 108. The engine 108 may be a four, six, or eight cylinder engine, have a V-configuration, horizontally opposed configuration, etc. The internal combustion engine 108 is rotationally coupled to an engine interface assembly 110 in the hybrid electric axle 104.

The engine interface assembly 110 includes a flange 112 and/or other suitable mechanical interface that is configured to rotationally coupled to the engine 108 via one or more shafts, joints, gears, and the like, in one example, as indicated via arrow 114, or directly to the engine, in another example. The engine interface assembly 110 further includes an input shaft 116 and a gear set 118.

The gear set 118 includes a pair of gears 120 and 122 in the illustrated example. However, alternate gear sets with a greater number of gears and/or gears in a different layout are possible. The gear 120 is mounted on a shaft 124 and the gear 122 is mounted on another shaft 126. Bearings 128 are coupled to the shaft 124 and bearings 130 are coupled to the shaft 126.

The engine interface assembly 110 further includes a one-way clutch 132 that is coupled to the input shaft 116 and the gear shaft 124. The one-way clutch 132 is configured to transfer torque from the input shaft 116 to the gear shaft 124 when the input shaft rotates in a forward drive direction and the input shaft has a speed equal to or greater than the gear shaft. However, when the input shaft rotates in the opposite direction (in relation to the forward drive direction), the one-way clutch freewheels such that torque transfer through the clutch is inhibited. The one-way clutch 132 may specifically be a sprag clutch due to the compactness and durability of the sprag clutch. However, other types of one-way clutches may be used in the hybrid electric axle.

The engine interface assembly 110 further includes a dog clutch 134 that is configured to selectively lock for rotation the input shaft 116 and the gear shaft 124. As described in greater detail herein, the dog clutch 134 may be engaged when the input shaft speed reaches the gear shaft speed. Further, bearings 136 and 138 are positioned between the input shaft 116 and the shaft 124 on opposing axial sides of the one-way clutch 132, in the illustrated example.

A gear 140 (e.g., a bevel gear) is additionally coupled to the shaft 126. The gear 140 meshes with an input gear 142 of a differential 144 (e.g., an electronic locking differential). The input gear 142 is coupled to a differential case 146. The differential 144 further includes an electronically actuated locking device 148 in the illustrated example. The locking device 148 is configured to selectively inhibit speed differentiation between side gears 150 of the differential.

The hybrid electric axle 104 further includes an electric drive assembly 152 that includes a traction motor 154. The traction motor 154 may be electrically coupled to an inverter 156. The inverter 156 is designed to convert direct current (DC) electric power to AC electric power (and vice versa in some examples). Therefore, the traction motor 154 may be an AC electric machine. However, in other examples, the traction motor 154 may be a DC electric machine and the inverter may therefore be omitted from the electric drive, in such an example. The inverter 156 may receive electric energy from one or more energy storage device(s) 158 (e.g., traction batteries, capacitors, combinations thereof, and the like). Arrows 160 signify the electric energy transfer between the traction motor 154, the inverter 156, and the energy storage device(s) 158 that may occur during different modes of electric axle operation (e.g., a drive mode and a regeneration mode). As such, during a drive mode, electric energy may flow from the energy storage device(s) 158 to the traction motor 154 and during a regenerative mode, electric energy may flow in the opposite direction from the electric machine to the energy storage device(s). The inverter 156 may be integrated into the hybrid electric axle 104, in one example, or positioned at a location in the vehicle spaced away from the axle, in another example. Further, in other examples, the traction motor may not be designed to operate as a generator to reduce axle complexity.

The traction motor 154 includes a stator 162 and a rotor 164 that includes a rotor shaft 166. Bearings 167 are coupled to the rotor shaft 166 and enable rotation thereof. Further, the rotor shaft 166 includes a central opening 169 to enable an axle shaft 170 to pass therethrough, as discussed in greater detail herein. As such, the traction motor 154 is arranged coaxial to the differential 144 in the hybrid electric axle.

The electric drive assembly 152 further includes a gear train 171 that is coaxially arranged with the traction motor

154, in the illustrated example, thereby enabling the hybrid electric axle to achieve a space efficient package that is able to be more easily integrated into a wider variety of vehicle platforms.

The gear train 171 includes a planetary gear set 172. The rotor shaft 166 is either directly coupled to the planetary gear set 172 or coupled to the planetary gear set using an intermediary shaft. Specifically, in the illustrated example, the planetary gear set 172 is a simple planetary gear set, in the illustrated example. A simple planetary gear set is a planetary gear set that solely includes a ring gear, a set of planet gears, a carrier, and a sun gear. To elaborate, as described herein a simple planetary gear set is a planetary gear set with solely a ring gear, a sun gear, a carrier, and multiple planet gears that are in the same plane as the ring gear and the sun gear and rotate on the carrier. Further, in the simple planetary gear set, each planet gear meshingly engages both the sun gear and the ring gear. However, in other examples, the planetary gear set 172 (and the other planetary gear sets described herein) may be a different type of planetary gear set such as a compound planetary gear set.

In the illustrated example, the planetary gear set 172 includes a sun gear 173 that is rotationally coupled (e.g., directly rotationally coupled) to the rotor shaft 166. In the illustrated example, a ring gear 174 in the planetary gear set 172 is mechanically grounded via a stationary component 175 such as a housing or other suitable component. In this way, the planetary gear set achieves a desired gear reduction ratio. A carrier 176 is coupled to a sun gear 177 in another planetary gear set 178, in the illustrated example.

The planetary gear set 172 further includes a set of planet gears 179 that mesh with the ring gear 174 and the sun gear 173. The planetary gear set 178 includes the sun gear 177, a carrier 180, a set of planet gears 181 that are rotatably mounted on the carrier 180, and a ring gear 182. In the illustrated example, the ring gear 182 is mechanically grounded via the stationary component 175. The carrier 180 is rotationally coupled to the differential 144 via a disconnect clutch 183, in the illustrated example. The disconnect clutch 183 that selectively rotationally couples and decouples the planetary gear set 178 from the differential 144. In other examples, the disconnect clutch may be omitted from the electric drive assembly.

Axle shafts 170 and 184 are rotationally coupled to the differential 144 and drive wheels 185. Specifically, the axle shaft 170 extends through central openings of the traction motor 154 and the planetary gear sets 172 and 178. A park gear 186 is coupled to the gear shaft 124. A park lock device 187 may be used to inhibit movement of the park gear 186.

The hybrid electric vehicle 100 may also include a control system 188 with a controller 189. The controller 189 includes a processor 190 and memory 191. The memory 191 holds instructions stored therein that when executed by the processor 190 cause the controller 189 to perform the various methods, control techniques, etc., described herein. The processor 190 may include a microprocessor unit and/or other types of circuits. The memory 191 includes known data storage mediums such as random access memory, read only memory, keep alive memory, combinations thereof, and the like.

The controller 189 may receive various signals from sensors 195 positioned in different locations in the hybrid electric vehicle 100, the hybrid electric axle 104, etc. The sensors may include a traction motor speed sensor, energy storage device temperature sensor(s), clutch position sensors, an energy storage device state of charge sensor(s), wheel speed sensors, an engine speed sensor, differential speed sensor, and the like. The controller 189 may also send control signals to various actuators 192 coupled at different locations in the hybrid electric vehicle 100, and the hybrid electric axle 104. For instance, the controller 189 may send signals to the inverter 156 to adjust the rotational speed of the traction motor 154. The other controllable components in the vehicle and powertrain may function in a similar manner with regard to command signals and actuator adjustment. For instance, the controller 189 may send signals to the dog clutch 134, the disconnect clutch 183, and the locking device 148 to engage and disengage the clutches/device to operate the powertrain in different modes, which are expanded upon herein. The controller and control system shown in FIG. 1 may be used in the other electric axle examples described herein. The controller 189 and the control system 188, more generally may be used to implement the control methods, techniques, strategies, etc. described herein.

The hybrid electric vehicle 100 may also include one or more input device(s) 193 (e.g., an accelerator pedal, a brake pedal, a gear selector, a differential locker actuator, a console instrument panel, a touch interface, a touch panel, a keyboard, combinations thereof, and the like) in electronic communication with the controller 189. The input device(s) 193, responsive to operator input, may generate an acceleration adjustment request, for instance.

An axis system is provided in FIG. 1 as well as 2-9, for reference. The z-axis may be a vertical axis (e.g., parallel to a gravitational axis), the y-axis may be a lateral axis (e.g., horizontal axis), and/or the x-axis may be a longitudinal axis, in one example. However, the axes may have other orientations, in other examples.

Figure 2:
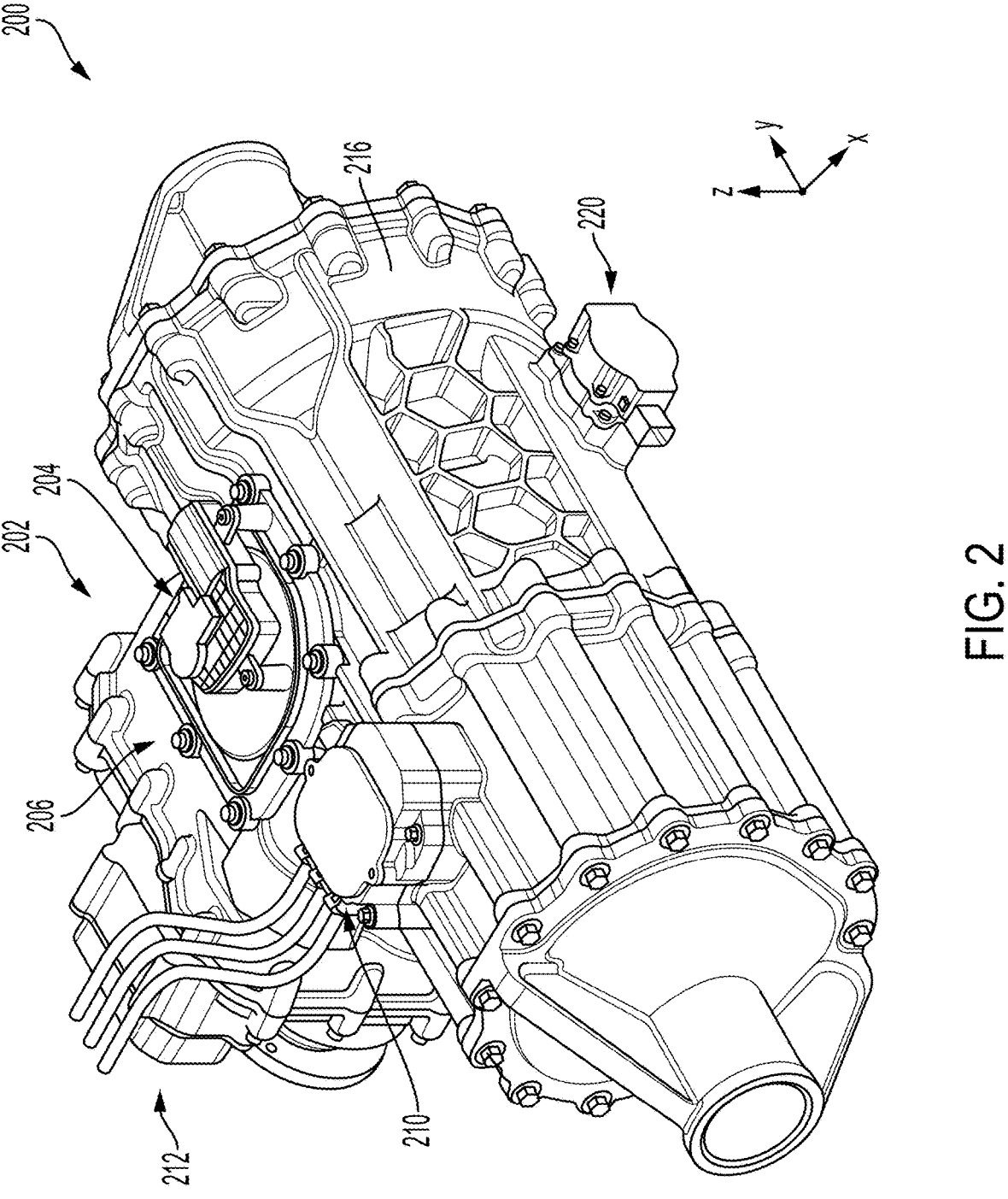
FIGS. 2-3 shows an example of a hybrid electric axle.
Figure 3:
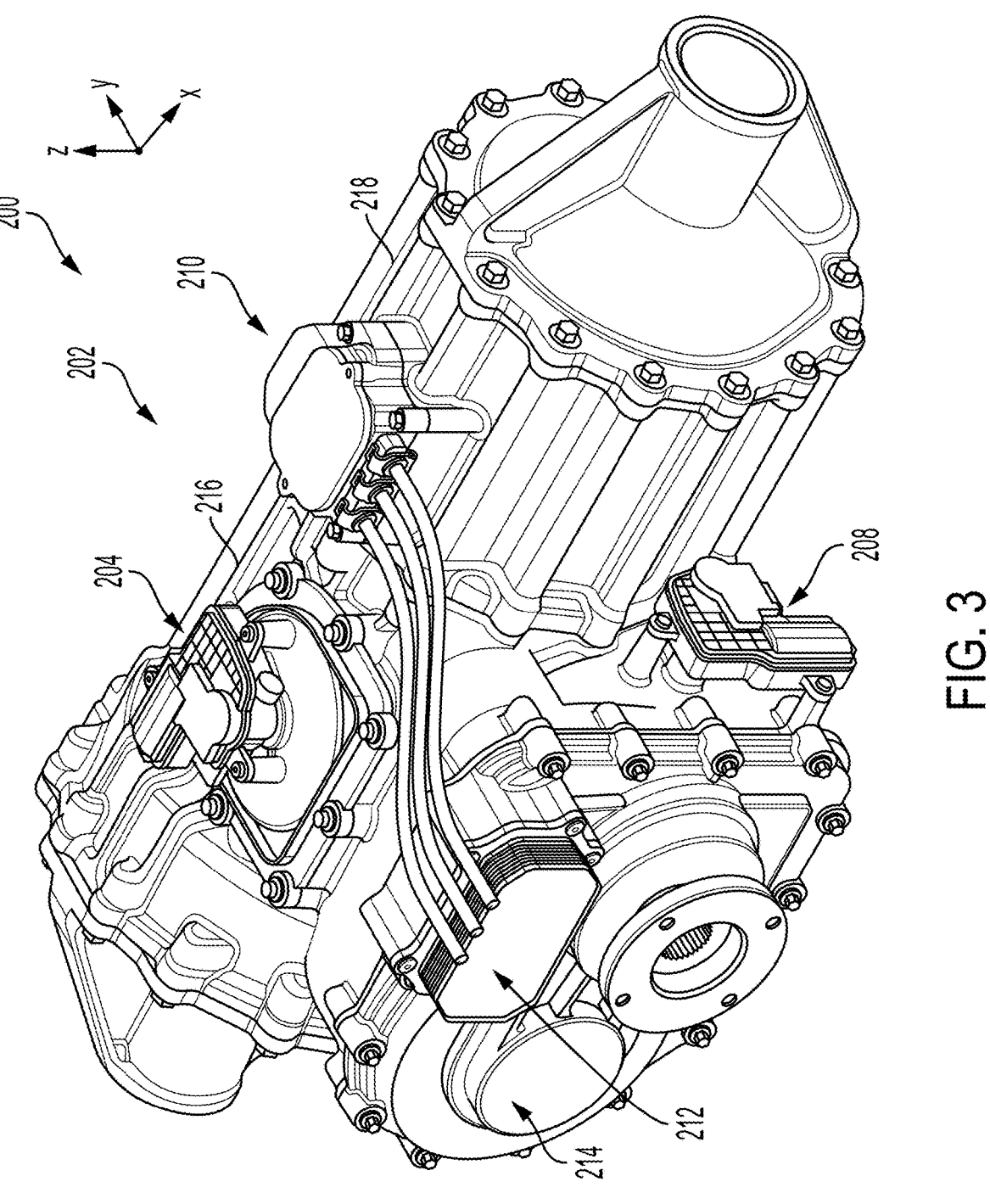

FIGS. 2 and 3 show a detailed example of a hybrid electric axle 200. To elaborate, the hybrid electric axle 200 shown in FIGS. 2 and 3 serves as an example of the hybrid electric axle 104 shown in FIG. 1. As such, at least a portion of the structural and/or functional features from the hybrid electric axle 104 shown in FIG. 1 may be included in the hybrid electric axle 200 shown in FIGS. 2 and 3 and vice versa.

The hybrid electric axle 200 includes a housing 202. To elaborate, in the illustrated example, the housing 202 includes different sections that are removably attached to one another. However, other housing configurations are possible.

A dual disconnect actuator 204 is coupled to the housing 202. Specifically, the dual disconnect actuator 204 is coupled to an upper side 206 of the housing in the illustrated example. However, the actuator may be positioned in other suitable locations in other examples. The dual disconnect actuator 204 is configured to actuate a dog clutch and a disconnect clutch in the hybrid electric axle 200 described in greater detail herein.

A park lock actuator 208 is coupled to the housing 202 in the illustrated example. Further, a cable box 210 (e.g., high voltage (HV) cable box) and a heat exchanger 212 are coupled to the housing 202. Specifically, the heat exchanger 212 may be coupled to a front cover 214 of the housing 202 and the park lock actuator 208 may be coupled to a body 216 of the housing 202. The body 216 of the housing 202 may enclose a portion of an electric drive assembly and an engine interface assembly, discussed in greater detail herein. A motor cover 218 that encloses a traction motor may be further included in the housing 202. An oil pump 220 may also be coupled to the housing 202.

Figure 4:
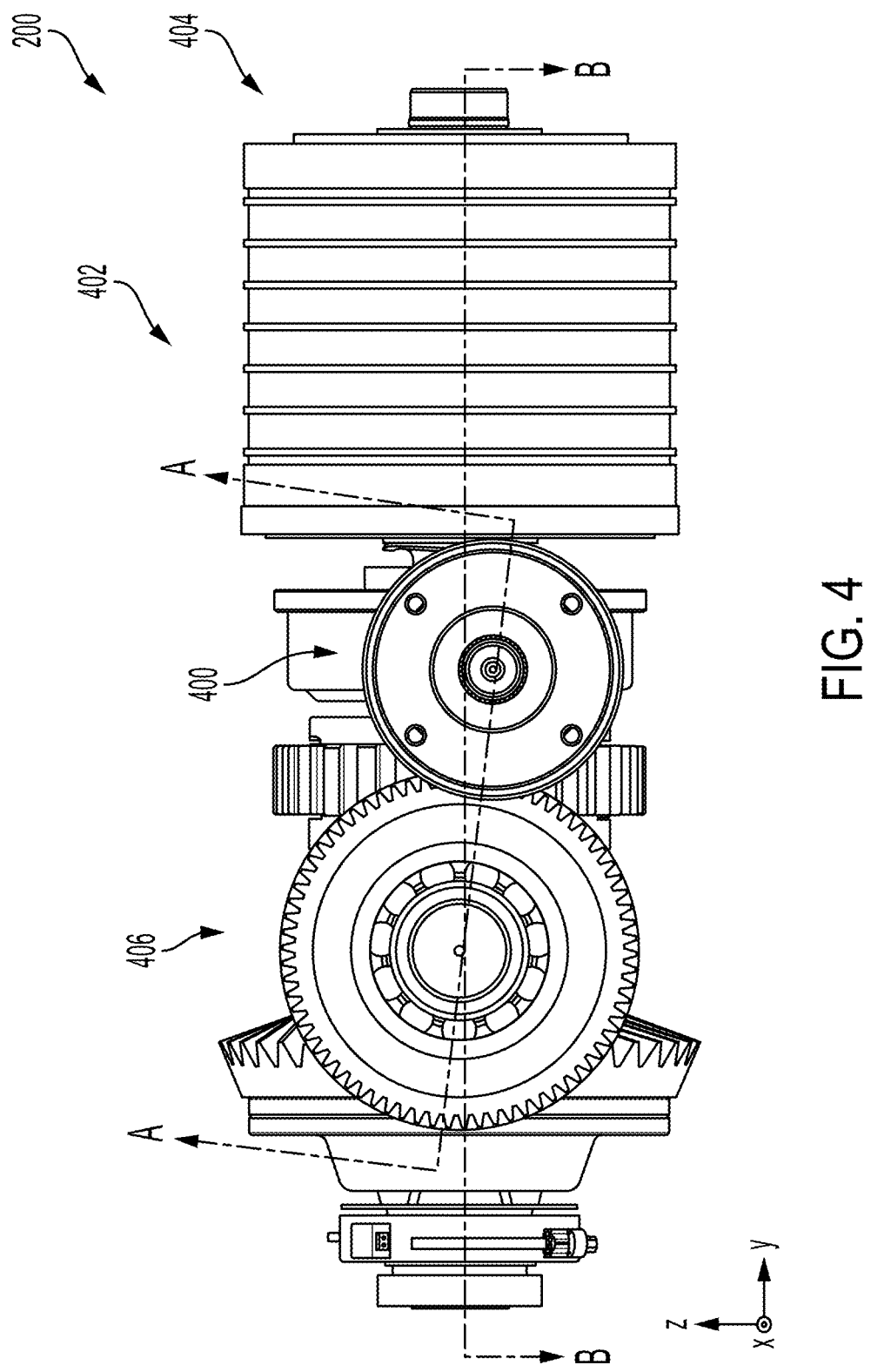
FIG. 4 shows a detailed view of an interior of the hybrid electric axle depicted in FIGS. 2-3.

FIG. 4 shows a detailed view of the hybrid electric axle 200 with the housing removed to reveal internal componentry. The hybrid electric axle 200 includes an engine interface assembly 400, an electric drive assembly 402 with a traction motor 404, and a differential 406. Cutting planes A-A and B-B indicate the location of the cross-sectional view depicted in FIG. 5.

Figure 5:
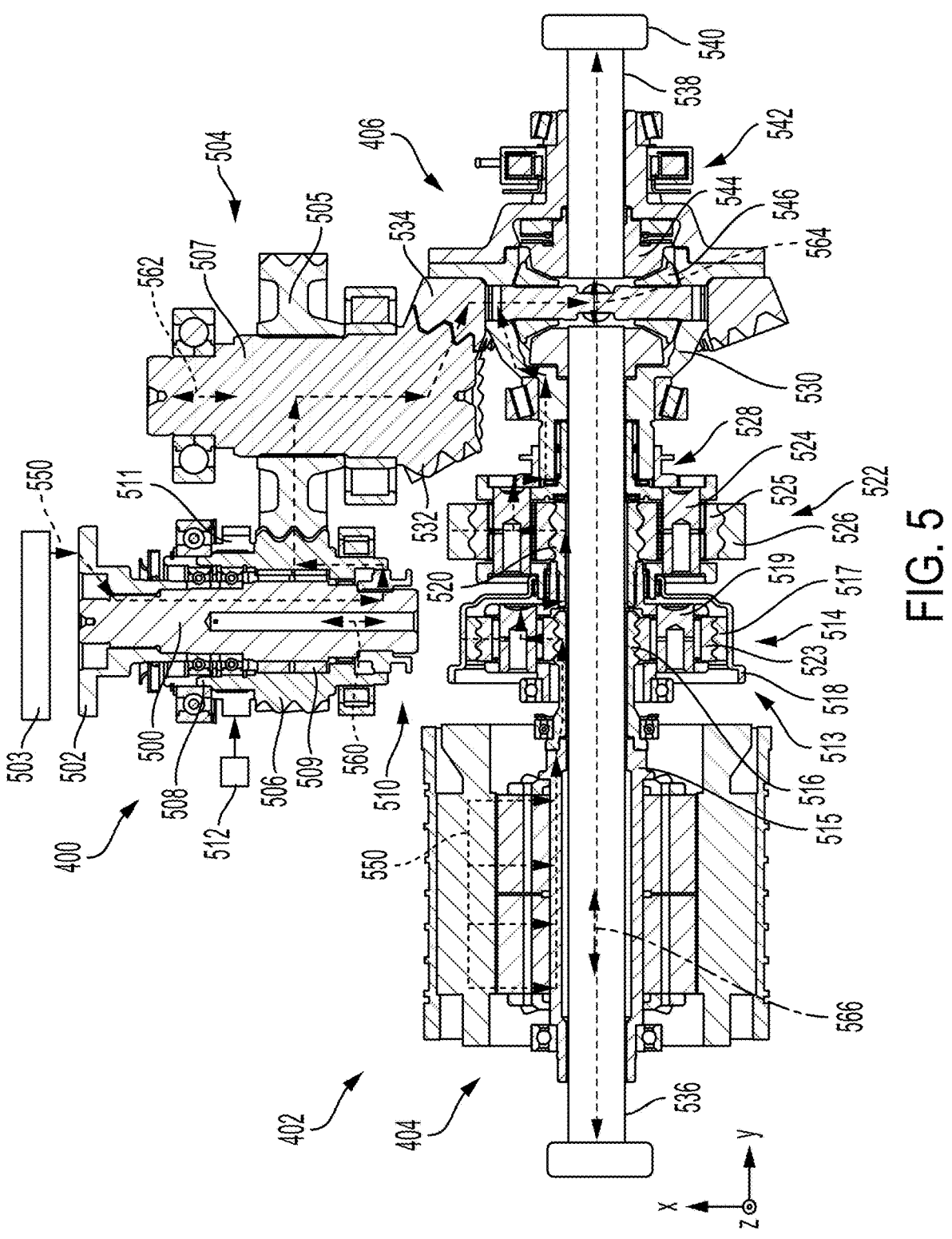
FIG. 5 shows a cross-sectional view of the hybrid electric axle depicted in FIG. 4.

FIG. 5 shows a cross-sectional view of the hybrid electric axle 200. The engine interface assembly 400, the electric drive assembly 402 with the traction motor 404, and the differential 406, are again depicted.

The engine interface assembly 400 includes an input shaft 500 with a mechanical interface 502 (e.g., an attachment flange) that rotationally attaches to an engine 503. A gear set 504 is further included in the engine interface assembly 400. The gear set 504 includes gears 505 and 506 that mesh with one another and are mounted on shafts 507 and 508, respectively.

The engine interface assembly 400 further includes a one-way clutch 509 (e.g., a sprag clutch) positioned between the input shaft 500 and the gear shaft 508. The one-way clutch 509 is configured to transfer torque from the input shaft 500 to the gear shaft 508 when the input shaft rotates in a forward drive direction and the input shaft has a greater speed than the gear shaft. However, when the input shaft rotates in the opposite direction (in relation to the forward drive direction), the one-way clutch freewheels such that torque transfer through the clutch is inhibited.

A dog clutch 510 is included in the engine interface assembly 400. The dog clutch 510 is configured to selectively rotationally couple the input shaft 500 and the gear shaft 508. The dog clutch 510 is engaged in the example illustrated in FIG. 5. It will be understood that when the dog clutch 510 is disengaged torque transfer through the dog clutch is inhibited.

A park gear 511 is coupled to the gear shaft 508, in the illustrated example. As previously discussed, a park lock device 512 may be used to selectively engage the park gear to prevent movement of the electric axle when the vehicle is stopped.

The electric drive assembly 402 includes the traction motor 404. The electric drive assembly 402 further includes a gear train 513 that is coaxially arranged with the traction motor 404, in the illustrated example, thereby enabling the hybrid electric axle to achieve a space efficient package that is able to be more easily integrated into a wider variety of vehicle platforms.

The gear train 513 includes a planetary gear set 514. A rotor shaft 515 of the motor is either directly coupled to the planetary gear set 514 or coupled to the planetary gear set using an intermediary shaft. Specifically, in the illustrated example, the planetary gear set 514 is a simple planetary gear set. A simple planetary gear set is a planetary gear set that solely includes a ring gear, a set of planet gears, a carrier, and a sun gear. To elaborate, as described herein a simple planetary gear set is a planetary gear set with solely a ring gear, a sun gear, a carrier, and multiple planet gears that are in the same plane as the ring gear and the sun gear and rotate on the carrier. Further, in the simple planetary gear set, each planet gear meshingly engages both the sun gear and the ring gear. However, in other examples, the planetary gear set 514 (and the other planetary gear sets described herein) may be a different type of planetary gear set such as a compound planetary gear set.

The planetary gear set 514 includes a sun gear 516 that is rotationally coupled (e.g., directly rotationally coupled) to the rotor shaft 515. In the illustrated example, a ring gear 517 in the planetary gear set 514 is mechanically grounded via a stationary component 518 such as a housing or other suitable component. In this way, the planetary gear set achieves a desired gear reduction ratio. A carrier 519 is coupled to a sun gear 520, in another planetary gear set 522, in the illustrated example. The planetary gear set 514 further includes a set of planet gears 523 that mesh with the ring gear 517 and the sun gear 516.

The planetary gear set 522 includes the sun gear 520, a carrier 524, a set of planet gears 525 that are rotatably mounted on the carrier 524, and a ring gear 526. In the illustrated example, the ring gear 526 is mechanically grounded via a stationary component (e.g., a housing or other suitable component). The carrier 524 is rotationally coupled to the differential 406 by way of a disconnect clutch 528, in the illustrated example. To elaborate, the carrier 524 is rotationally coupled to a case 530 in the differential 406 by way of the disconnect clutch 528.

The differential 406 further includes an input gear 532 that meshes with a gear 534 that is mounted onto the shaft 507. The gear 534 is included in the gear set 504. An electronic locking device 535 is included in the differential 406, in the illustrated example.

Axle shafts 536 and 538 are rotationally coupled to the differential 406 and drive wheels 540. Specifically, the axle shaft 536 extends through central openings of the traction motor 404 and the planetary gear sets 514 and 522.

The differential 406 includes an electronically actuated locking device 542 in the illustrated example. The locking device 542 is configured to selectively inhibit speed differentiation between side gears 544 of the differential. The differential further includes spider gears 546 that mesh with the side gears 544, in the illustrated example.

A power path 550 is further depicted in FIG. 5 during forward hybrid drive operation where both the engine 503 and the traction motor 404 are providing power to the differential 406. It will be understood that the dog clutch 510 is engaged during the forward hybrid drive operation mode. As shown, the power path 550 travels from the traction motor 404, through the planetary gear sets 514 and 522, from the planetary gear set 522 to the differential 406 by way of the disconnect clutch 528. Further, the power path 550 travels from the engine 503 to the input shaft 500, from the input shaft 500 to the gear shaft 508 by way of the dog clutch 510. The power path 550 then travels through the gears 506 and 505 to the differential 406 via gears 532 and 534. From the differential, power travels to the drive wheels 540 via axle shafts. In this way, during hybrid drive operation power from both the engine 503 and traction motor 404 are simultaneously delivered to the differential 406.

A rotational axis 560 of the input shaft 500, a rotational axis 562 of the gear shaft 507, a rotational axis 564 of the differential 406, and a rotational axis 566 of the traction motor 404 are provided in FIG. 5 for reference.

Figure 6:
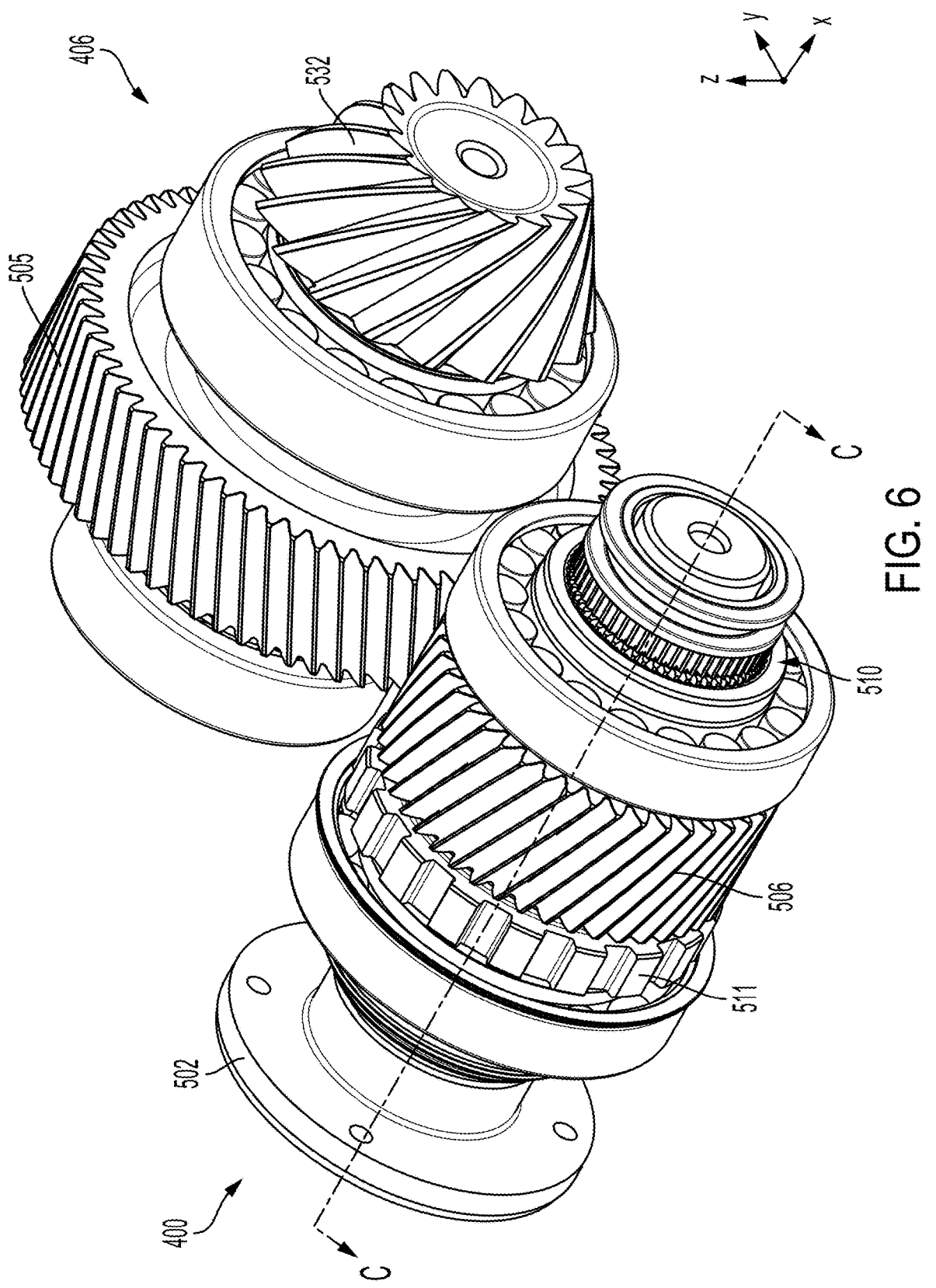
FIG. 6 shows a detailed view of an engine interface assembly in the hybrid electric axle depicted in FIGS. 2-3.

FIG. 6 shows a detailed view of the engine interface assembly 400. The mechanical interface 502, the gear 506, the park gear 511, and the dog clutch 510 in the engine interface assembly 400 are again depicted. Further, the gear 505 and the gear 532 are depicted. Cutting plane C-C denotes the location of the cross-sectional view depicted in FIG. 7A.

Figures 7A, 7B:
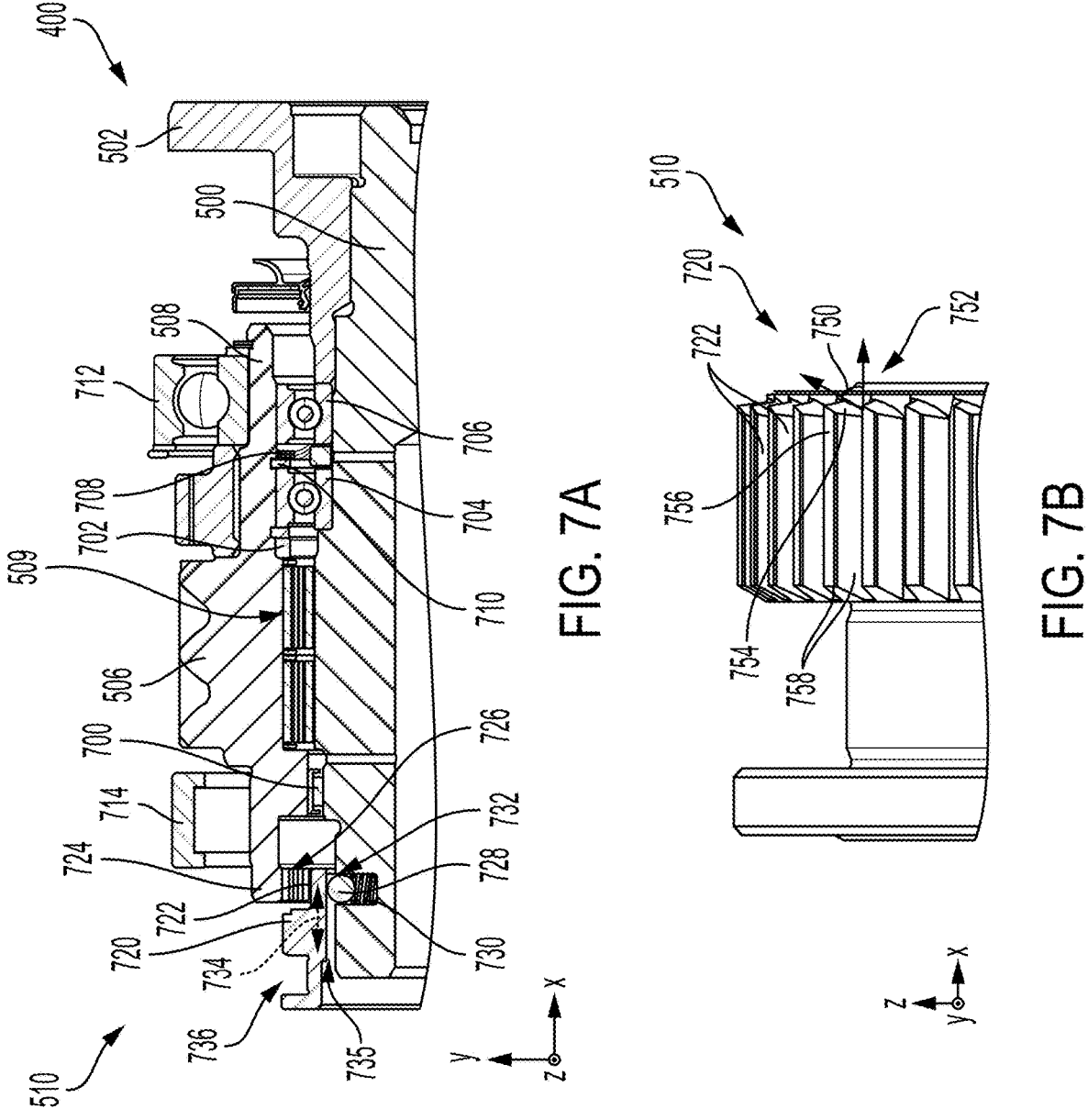
FIGS. 7A and 7B show a cross-sectional view of the engine interface assembly depicted in FIG. 6.

FIG. 7A shows a cross-sectional view of the engine interface assembly 400. The input shaft 500, the one-way clutch 509, the gear shaft 508, the gear 506, the mechanical interface 502, and the dog clutch 510 are again depicted.

A sprag pilot bearing 700, a sprag spacer 702, bearings 704 and 706, a preload spring 708, a preload spacer 710, bearings 712, and 714 are further depicted in the illustrated example. However, other engine interface assembly configurations have been contemplated.

FIG. 7A further shows a lock ring 720 in the dog clutch that includes teeth 722 on an external surface that mate with teeth 724 in a dog clutch interface 726 in the gear shaft 508. The dog clutch may further include an indexing ball 728 and a spring 730 arranged in a recess 732 of the input shaft 500. The ball detent provides some stiffness but allows compliance as the dog clutch teeth index, as discussed in greater detail herein.

The teeth 722 in the lock ring 720 may have an indexing angle at their leading edge as discussed in greater detail herein. The lock ring 720 moves along axis 734 to engage and disengage the dog clutch interface 726 on the gear shaft 508. A splined interface 735 is formed between the lock ring 720 and the input shaft 500. Further, the splined interface 735 between the locker ring and input shaft have enough backlash to index a single tooth over, in the illustrated example. The splined interface includes splines on an interior surface of the lock ring and splines on an outer surface of the input shaft.

Further, the lock ring 720 may be splined or otherwise slidingly attached to the input shaft 500. The lock ring 720 includes a fork interface 736 in the illustrated example. In this way, the lock ring 720 may be actuated via an actuation system. However, other types of actuators are possible.

FIG. 7B shows a detailed view of the lock ring 720 in the dog clutch 510. An angle 750 of the leading edge 752 of the teeth 722 are depicted. In this way, the dog clutch teeth have lead-in chamfer that applies a torque between the lock ring 720 and the input shaft. Each of the teeth 722 include a front face 754, a top surface 756, and side surfaces 758.

Figure 8:
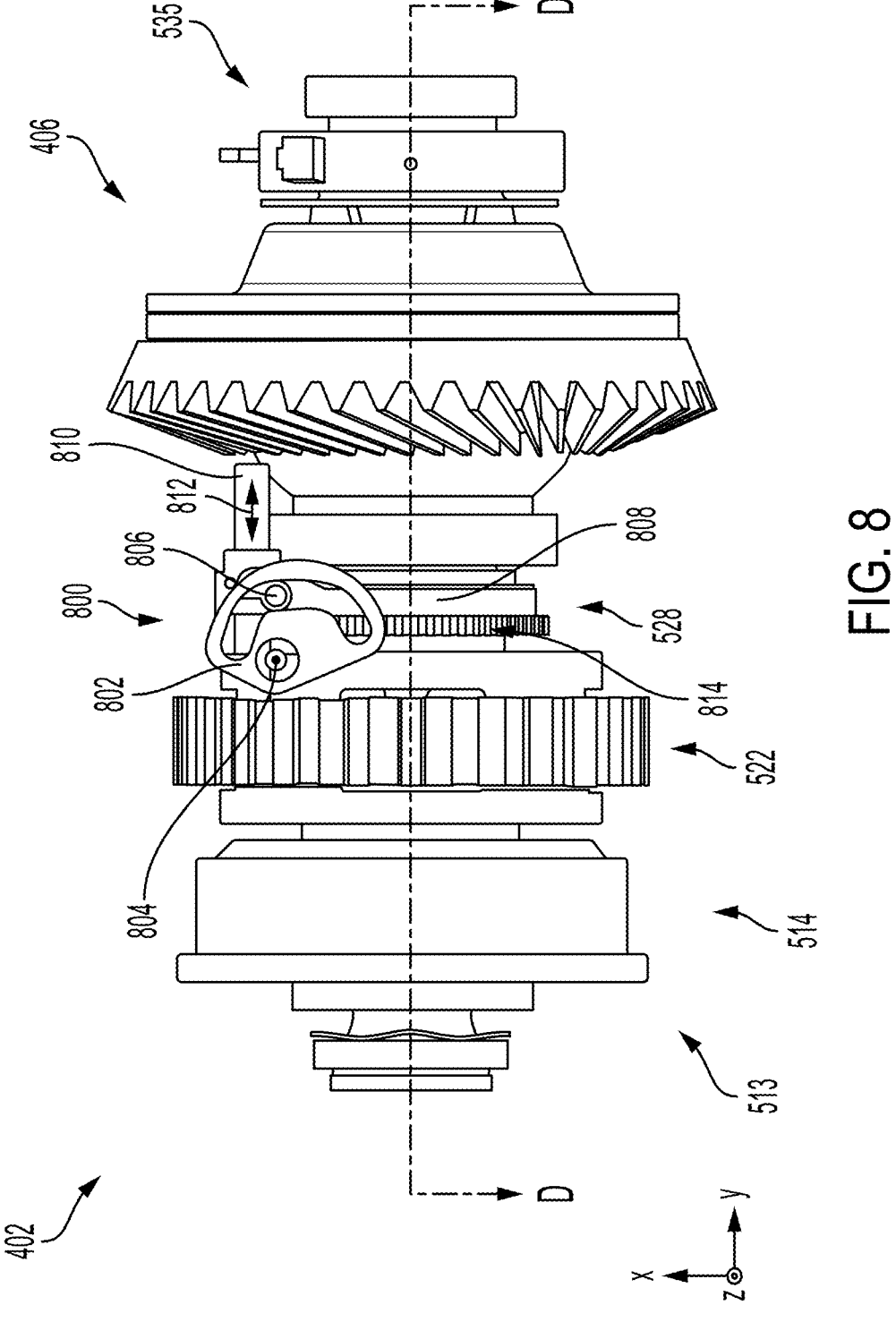
FIG. 8 shows detailed view of an electric drive assembly in the hybrid electric axle depicted in FIGS. 2-3.

FIG. 8 shows a detailed view of the electric drive assembly 402 with the traction motor omitted to reveal other components. The planetary gear sets 514 and 522 in the gear train 513, the disconnect clutch 528, a disconnect clutch actuator 800, and the differential 406 with the electronic locking device 535 are again illustrated. Cutting plane D-D indicates the location of the cross-sectional view depicted in FIG. 9.

In the illustrated example, the clutch actuator 800 includes a cam plate 802 that rotates about an axis 804 and mates with an extension 806 of a shift fork 808. When the cam plate 802 is rotated either via an electric motor or other suitable mechanism the shift fork 808 is moved such that it axially translates along a shaft 810 as indicated via arrows 812. In turn, the shift fork 808 moves a lock ring 814 into and out of engagement with a toothed interface in the carrier of the planetary gear set 522.

Figure 9:
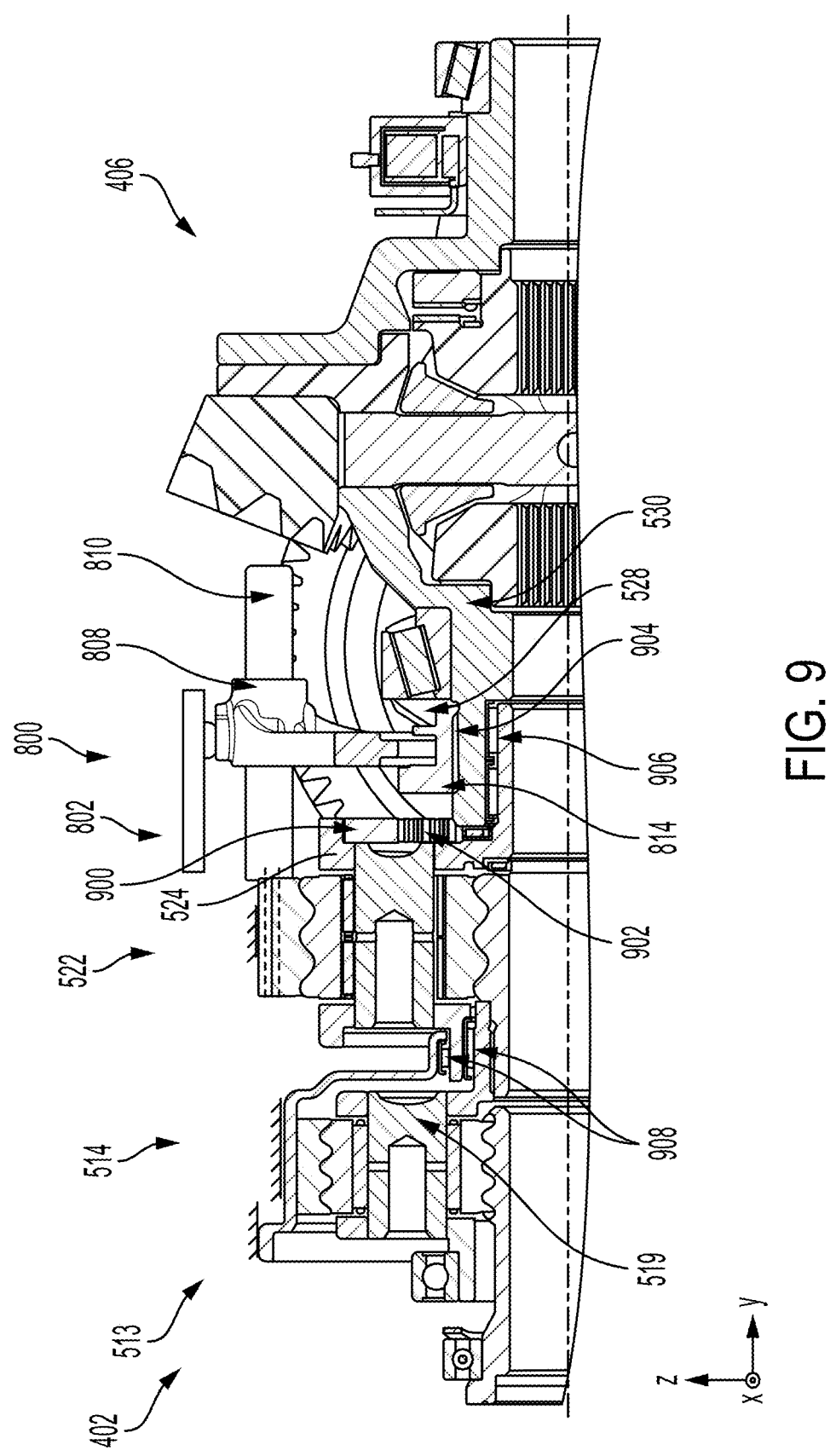
FIG. 9 shows a cross-sectional view of the electric drive assembly depicted in FIG. 8.

FIG. 9 shows a cross-sectional view of the electric drive assembly 402. The gear train 513 with the planetary gear sets 514 and 522, the disconnect clutch 528, the disconnect clutch actuator 800, and the differential 406 with the electronic locking device 535 are again illustrated. The shift fork 808, the cam plate 802, and the shaft 810 in the actuator 800 are again depicted.

FIG. 9 further shows the lock ring 814 disengaged from a toothed interface 900 that is coupled (e.g., welded) to the carrier 524. The toothed interface 900 includes multiple teeth 902 on an interior surface. The lock ring 814 forms a splined interface 904 with the case 530 of the differential 406. FIG. 9 further shows bearings 906 (e.g., needle roller bearings) arranged between the carrier 524 and the case 530. Further, FIG. 9 shows bearings 908 positioned between the carrier 524 and the carrier 519 in the planetary gear set 514.

Figure 10:
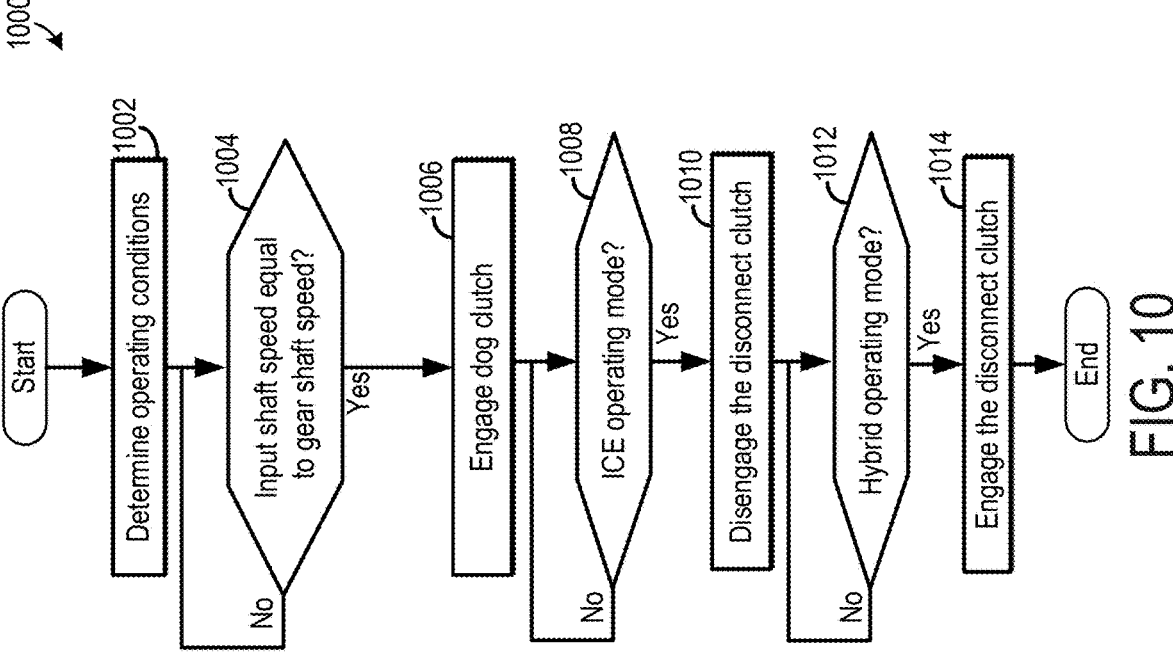
FIG. 10 shows a method for operation of a hybrid electric axle.

FIG. 10 shows a method 1000 for operation of a hybrid electric axle. The method 1000 may be carried out by any of the hybrid electric axles described herein or combinations of the hybrid electric axles. In other examples, the methods may be implemented via other suitable hybrid electric axles. Furthermore, the method 1000 may be implemented by a controller that includes memory holding instructions for implementing the method steps that are executable by a processor, as previously indicated.

At 1002, the method includes determining operating conditions in the hybrid electric axle, the vehicle, and the components included therein. The operating conditions may be ascertained from sensors and/or modeling and may include clutch configurations, traction motor speed, engine speed, wheel speed, and the like. The operating conditions may include engine speed, traction motor speed, wheel speed, traction battery state of charge, traction battery temperature, clutch positions, vehicle load, and the like.

At 1004, the method includes determining if the input shaft speed has reached the speed of the gear shaft (e.g., the gear shaft 508, shown in FIG. 5) in the engine interface assembly. It will be understood that the input shaft speed is equivalent or proportional to engine speed and the gear shaft speed is proportional to wheel speed. As such, in an another example, the method may determine if the engine speed is matched with axle shaft or wheel speed.

If it is determined that the input shaft speed has not reached gear shaft speed (NO at 1004), the method returns to 1004. Conversely, if it is determined that the input shaft speed has reached gear shaft speed (YES at 1004), the method moves to 1006 where the method includes engaging the dog clutch in the engine interface assembly. Engaging the dog clutch, allows unstable loading as the speeds of the wheel and engine or torque flow changes to be avoided, thereby increasing electric axle longevity.

Next at 1008, the method includes determining if the hybrid electric axle should be operated in an all ICE mode where the engine solely provides propulsive power to the differential. This determination may take into account vehicle load, vehicle speed, target vehicle speed, and the like. For instance, the hybrid electric axle may be switched to an all ICE mode when a state of charge of the traction battery drops below a threshold value.

If it is determined that the hybrid electric axle should not be operated in an ICE mode (NO at 1008), the method returns to 1004. Conversely, if it is determined that the hybrid electric axle should be operated in an ICE mode (YES at 1008), the method moves to 1010 where the method includes disengaging the disconnect clutch in the electric drive assembly in the electric axle. Disengaging the disconnect clutch allows drag losses to be reduced during all ICE operation.

Next at 1012, the method includes determining if the hybrid electric axle should be operated in a hybrid mode where both the engine and the traction motor provide power to the differential. The hybrid mode may be triggered when vehicle load surpasses a threshold value (e.g., a non-zero value).

If it is determined that the hybrid electric axle should not be operated in the hybrid mode (NO at 1012) the method returns to 1012. Conversely, if it is determined that the hybrid electric axle should be operated in the hybrid mode (YES at 1012), the method moves to 1014 where the method includes engaging the disconnect clutch. In this way, power delivery to the differential is efficiently managed. Further in one example, the hybrid electric axle may be operated in an all-electric drive mode, where the dog clutch is disengaged and engagement of the disconnect clutch is sustained.

FIGS. 1-9 show example configurations with relative positioning of the various components. However, the components may have other relative sizes, in other embodiments. It will be appreciated that if shown directly contacting each other, or directly coupled, then such elements may be referred to as directly contacting or directly coupled, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Still further in some examples, elements positioned coaxial or parallel to one another may be referred to as such.

The invention is further described in the following paragraphs. In one aspect, a hybrid electric axle system is provided that comprises an engine interface assembly comprising: a one-way clutch rotationally coupled to an input shaft and a gear set that is rotationally coupled to a differential; and a dog clutch configured to selectively rotationally couple the input shaft and a gear shaft in the gear set; wherein the input shaft includes a mechanical interface that is configured to receive mechanical power from an internal combustion engine; an electric drive assembly including a traction motor that is rotationally coupled to a gear train; wherein the gear train is rotationally coupled to the differential; and wherein the engine interface assembly and the electric drive assembly are packaged in an axle housing. In one example, the dog clutch may include a lock ring with teeth that mate with teeth in the gear; and the teeth in the lock ring may include leading faces that are chamfered. In one example, the dog clutch may include an indexing ball and spring that are arranged in a recess in the input shaft. In one example, the gear train may include a first planetary gear set that is rotationally coupled to the traction motor and a second planetary gear set that is rotationally coupled to the differential. In another example, the hybrid electric axle system may further comprise an electric drive disconnect clutch configured to selectively rotationally disconnect the second planetary gear set from the differential. In another example, the first and second planetary gear sets may be simple planetary gear sets; a first sun gear in the first planetary gear set may be rotationally coupled to the traction motor; a first carrier in the first planetary gear set may be rotationally coupled to a second sun gear in the second planetary gear set; and a second carrier in the second planetary gear set may be rotationally coupled to the electric drive disconnect clutch. In another example, the hybrid electric axle system may further comprise a dual disconnect actuator configured to independently actuate the dog clutch and the electric drive disconnect clutch, wherein the dual disconnect actuator may be integrated into the housing. In one example, the one-way clutch may be a sprag clutch. In another example, the differential may be an electronic locking differential.

In another aspect, a method for operation of a hybrid electric axle system is provided that comprises selectively rotationally coupling an input shaft and a gear shaft in a gear set via a dog clutch, in response to engagement of a one-way clutch; wherein the hybrid electric axle system comprises: the engine interface assembly comprises: the one-way clutch rotationally coupled to the input shaft and the gear shaft in the gear set that is rotationally coupled to a differential; and the dog clutch configured to selectively rotationally couple the input shaft and the gear in the gear set; wherein the input shaft includes a mechanical interface that is configured to receive mechanical power from an internal combustion engine; an electric drive assembly including a traction motor that is rotationally coupled to a gear train; wherein the gear train is rotationally coupled to the differential; and wherein the engine interface assembly and the electric drive assembly are packaged in an axle housing. In one example, the method may further comprise engaging a parking gear that is directly coupled to the gear shaft. In another example, the dog clutch may include a lock ring with teeth that mate with teeth in the gear; the teeth in the lock ring may include leading faces that are chamfered; and the dog clutch may include an indexing ball and spring that are arranged in a recess in the input shaft. In another example, the gear train may include a first planetary gear set that is rotationally coupled to the traction motor and a second planetary gear set that is rotationally coupled to the differential; and the hybrid electric axle system may further include an electric drive disconnect clutch configured to selectively rotationally disconnect the second planetary gear set from the differential. In another example, the first and second planetary gear sets may be simple planetary gear sets; a first sun gear in the first planetary gear set may be rotationally coupled to the traction motor; a first carrier in the first planetary gear set may be rotationally coupled to a second sun gear in the second planetary gear set; and a second carrier in the second planetary gear set may be rotationally coupled to the electric drive disconnect clutch. In one example, the hybrid electric axle system may further comprise a dual disconnect actuator configured to independently actuate the dog clutch and the electric drive disconnect clutch, wherein the dual disconnect actuator is integrated into the housing.

In another aspect, a hybrid electric axle system is provided that comprises an engine interface assembly comprising: a sprag clutch rotationally coupled to an input shaft and a gear shaft in gear set that is rotationally coupled to a differential; and a dog clutch configured to selectively rotationally couple the input shaft and a gear shaft in the gear set; wherein the input shaft includes a mechanical interface that is configured to receive mechanical power from an internal combustion engine; an electric drive assembly including a traction motor that is rotationally coupled to a gear train; wherein the gear train is rotationally coupled to the differential; and wherein the engine interface assembly and the electric drive assembly are packaged in an axle housing; wherein the input shaft is transversely arranged in relation to the traction motor. In one example, the dog clutch may include a lock ring with teeth that mate with teeth in the gear; the teeth in the lock ring may include leading faces that are chamfered; and the dog clutch may include an indexing ball and spring that are arranged in a recess in the input shaft. In one example, the gear train may include a first planetary gear set that is rotationally coupled to the traction motor and a second planetary gear set that is rotationally coupled to the differential wherein the hybrid electric axle system further comprises an electric drive disconnect clutch configured to selectively rotationally disconnect the second planetary gear set from the differential. In one example, the first and second planetary gear sets may be simple planetary gear sets; a first sun gear in the first planetary gear set may be rotationally coupled to the traction motor; a first carrier in the first planetary gear set may be rotationally coupled to a second sun gear in the second planetary gear set; and a second carrier in the second planetary gear set may be rotationally coupled to the electric drive disconnect clutch. In one example, the hybrid powertrain may further comprise a dual disconnect actuator configured to independently actuate the dog clutch and the electric drive disconnect clutch, wherein the dual disconnect actuator is integrated into the housing.

In another example, a hybrid electric axle system is provided that comprises an engine interface assembly including an input shaft with a mechanical interface that is configured to receive mechanical power from an internal combustion engine; an electric drive assembly including: a traction motor that is rotationally coupled to a gear train; and a disconnect clutch configured to selectively rotationally couple the gear train to a differential; wherein the engine interface assembly and the electric drive assembly are packaged in an axle housing; a controller configured to: disengage the disconnect clutch in response to traction motor shut-down. In one example, the engine interface assembly may include a one-way clutch rotationally coupled to an input shaft and a gear set that is rotationally coupled to a differential; and a dog clutch configured to selectively rotationally couple the input shaft and a gear shaft in the gear set. In another example, the hybrid electric axle system may further comprise a dual disconnect actuator configured to independently actuate the dog clutch and the electric drive disconnect clutch, wherein the dual disconnect actuator is integrated into the axle housing. In another example, the controller may be configured to: sustain engagement of the dog clutch while the disconnect clutch is disengaged. In another example, the controller may be configured to, prior to sustaining engagement of the dog clutch: engage the dog clutch in response to a speed of the input shaft reaching a speed of the gear shaft. In another example, the gear shaft may circumferentially surround the input shaft. In another example, the input shaft may be arranged perpendicular to the traction motor. In another example, the controller may be further configured to: engage the disconnect clutch and initiate traction motor operation in response to vehicle load surpassing a threshold value. In yet another example, the gear train may include a first planetary gear set and a second planetary gear set; the first planetary gear set may be rotationally coupled to the traction motor; and the disconnect clutch may be configured to selectively rotationally couple the second planetary gear set and the differential. In one example, the first planetary gear set and the second planetary gear set may be simple planetary gear sets.

In another aspect, a method for operation of a hybrid electric axle system is provided that comprises disengaging the disconnect clutch in response to traction motor shutdown; wherein the hybrid electric axle system includes: an engine interface assembly including an input shaft with a mechanical interface that is configured to receive mechanical power from an internal combustion engine; and an electric drive assembly including: a traction motor that is rotationally coupled to a gear train; and a disconnect clutch configured to selectively rotationally couple the gear train to a differential; wherein the engine interface assembly and the electric drive assembly are packaged in an axle housing. In another example, the engine interface assembly may include: a one-way clutch rotationally coupled to an input shaft and a gear set that is rotationally coupled to a differential; and a dog clutch configured to selectively rotationally couple the input shaft and a gear shaft in the gear set; wherein the method further comprises sustain engagement of the dog clutch while the disconnect clutch is disengaged. In another example, the hybrid electric axle system may further comprise: a dual disconnect actuator configured to independently actuate the dog clutch and the disconnect clutch, wherein the dual disconnect actuator is integrated into the axle housing. In another example, the method may further comprise engaging the disconnect clutch and initiate traction motor operation in response to vehicle load surpassing a threshold value. In another example, the hybrid electric axle system may further comprise: a dual disconnect actuator configured to independently actuate the dog clutch and the electric drive disconnect clutch, wherein the dual disconnect actuator is integrated into the axle housing.

In another aspect, a hybrid electric axle system is provided that comprises an engine interface assembly including an input shaft with a mechanical interface that is configured to receive mechanical power from an internal combustion engine; wherein the engine interface assembly includes: a one-way clutch rotationally coupled to an input shaft and a gear set that is rotationally coupled to a differential; and a dog clutch configured to selectively rotationally couple the input shaft and a gear shaft in the gear set; an electric drive assembly including: a traction motor that is rotationally coupled to a gear train; and a disconnect clutch configured to selectively rotationally couple the gear train to a differential; wherein the engine interface assembly and the electric drive assembly are packaged in an axle housing; a controller configured to: selectively disengage the disconnect clutch. In another example, the hybrid electric axle system may further comprise a dual disconnect actuator configured to independently actuate the dog clutch and the electric drive disconnect clutch, wherein the dual disconnect actuator is integrated into the axle housing, wherein the controller is configured to: sustain engagement of the dog clutch while the disconnect clutch is disengaged. In another example, the controller may be configured to, prior to sustaining engagement of the dog clutch: engage the dog clutch in response to a speed of the input shaft reaching a speed of the gear shaft. In another example, selectively disengaging the disconnect clutch may include: disengaging the disconnect clutch in response to traction motor shutdown. In another example, selectively disengaging the disconnect clutch may include: engaging the disconnect clutch in response to vehicle load surpassing a threshold value.

Note that the example control and estimation routines included herein can be used with various powertrain, transmission, and/or vehicle system configurations. The control methods and routines disclosed herein may be stored as executable instructions in non-transitory memory and may be carried out by the control system including the controller in combination with the various sensors, actuators, and other vehicle hardware. Further, the described actions, operations and/or functions may graphically represent code to be programmed into non-transitory memory of the computer readable storage medium in the vehicle control, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and internal combustion engines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid electric axle system, comprising:
an engine interface assembly comprising:
  a one-way clutch rotationally coupled to an input shaft and a gear set that is rotationally coupled to a differential; and
  a dog clutch configured to selectively rotationally couple the input shaft and a gear shaft in the gear set;
  wherein the input shaft includes a mechanical interface that is configured to receive mechanical power from an internal combustion engine; and
an electric drive assembly including a traction motor that is rotationally coupled to a gear train;
wherein the gear train is rotationally coupled to the differential;
wherein the engine interface assembly and the electric drive assembly are packaged in an axle housing; and
wherein a rotational axis of the engine interface assembly is arranged perpendicular to a rotational axis of the traction motor.

2. The hybrid electric axle system of claim 1, wherein:
the dog clutch includes a lock ring with teeth that mate with teeth in the gear shaft; and
  the teeth in the lock ring include leading faces that are chamfered.

3. The hybrid electric axle system of claim 2, wherein the dog clutch includes an indexing ball and spring that are arranged in a recess in the input shaft.

4. The hybrid electric axle system of claim 1, wherein the gear train includes a first planetary gear set that is rotationally coupled to the traction motor and a second planetary gear set that is rotationally coupled to the differential.

5. The hybrid electric axle system of claim 4, wherein the first planetary gear set and the second planetary are simple planetary gear sets that each include a grounded ring gear.

6. The hybrid electric axle system of claim 5, wherein the traction motor is arranged coaxial to the differential.

7. The hybrid electric axle system of claim 1, wherein the one-way clutch is a sprag clutch.

8. The hybrid electric axle system of claim 1, wherein the differential is an electronic locking differential.

9. A method for operation of a hybrid electric axle system, comprising:
  selectively rotationally coupling an input shaft and a gear shaft in a gear set via a dog clutch, in response to engagement of a one-way clutch in an engine interface assembly;
  wherein the hybrid electric axle system comprises:
    the engine interface assembly comprises:
      the one-way clutch rotationally coupled to the input shaft and the gear shaft in the gear set that is rotationally coupled to a differential; and
      the dog clutch configured to selectively rotationally couple the input shaft and the gear shaft in the gear set;
      wherein the input shaft includes a mechanical interface that is configured to receive mechanical power from an internal combustion engine; and
    an electric drive assembly including a traction motor that is rotationally coupled to a gear train;
    wherein the gear train is rotationally coupled to the differential;
    wherein the engine interface assembly and the electric drive assembly are packaged in an axle housing; and
    wherein the gear train includes a first simple planetary gear set that is rotationally coupled to the traction motor and a second simple planetary gear set that is rotationally coupled to the differential.

10. The method of claim 9, further comprising engaging a parking gear that is directly coupled to the gear shaft.

11. The method of claim 9, wherein:
  the dog clutch includes a lock ring with teeth that mate with teeth in the gear shaft;
    the teeth in the lock ring include leading faces that are chamfered; and
    the dog clutch includes an indexing ball and spring that are arranged in a recess in the input shaft.

12. The method of claim 9, wherein:
  a first ring gear in the first simple planetary gear set is grounded;
  a second ring gear in the second simple planetary gear set is grounded;

a sun gear in the first simple planetary gear set is rotationally coupled to a rotor shaft of the traction motor; and
  a carrier in the second simple planetary gear set is rotationally coupled to the differential.

13. The method of claim 12, wherein:
  the traction motor is arranged coaxial to the differential; and
  the engine interface assembly is arranged perpendicular to the traction motor.

14. A hybrid electric axle system, comprising:
  an engine interface assembly comprising:
    a sprag clutch rotationally coupled to an input shaft and a gear shaft in gear set that is rotationally coupled to a differential; and
    a dog clutch configured to selectively rotationally couple the input shaft and the gear shaft in the gear set;
    wherein the input shaft includes a mechanical interface that is configured to receive mechanical power from an internal combustion engine; and
  an electric drive assembly including a traction motor that is rotationally coupled to a gear train;
  wherein the gear train is rotationally coupled to the differential;
  wherein the engine interface assembly and the electric drive assembly are packaged in an axle housing; and
  wherein the input shaft is transversely arranged in relation to the traction motor.

15. The hybrid electric axle system of claim 14, wherein:
  the dog clutch includes a lock ring with teeth that mate with teeth in the gear;
    the teeth in the lock ring include leading faces that are chamfered; and
    the dog clutch includes an indexing ball and spring that are arranged in a recess in the input shaft.

16. The hybrid electric axle system of claim 14, wherein:
  a first ring gear in the first simple planetary gear set is grounded;
  a second ring gear in the second simple planetary gear set is grounded.

17. The hybrid electric axle system of claim 16, wherein:
  a first sun gear in the first simple planetary gear set is rotationally coupled to a rotor shaft of the traction motor; and
  a first carrier is rotationally coupled to a second sun gear in the second simple planetary gear set; and
  a second carrier in the second simple planetary gear set is rotationally coupled to the differential.

18. The hybrid electric axle system of claim 17, wherein:
  the traction motor is arranged coaxial to the differential; and
  the engine interface assembly is arranged perpendicular to the traction motor.

* * * * *